United States Patent
Guillama et al.

(10) Patent No.: US 11,509,922 B2
(45) Date of Patent: Nov. 22, 2022

(54) CLOAKING AND WATERMARK OF NON-CODED INFORMATION

(71) Applicant: The Quantum Group, Inc., Lake Worth, FL (US)

(72) Inventors: Noel J. Guillama, Wellington, FL (US); Chester A. Heath, Boca Raton, FL (US)

(73) Assignees: THE QUANTUM GROUP, INC., Lake Worth, FL (US); Noel J. Guillama, Wellington, FL (US)

( * ) Notice: Subject to any disclaimer, the term of this patent is extended or adjusted under 35 U.S.C. 154(b) by 0 days.

(21) Appl. No.: 16/947,189

(22) Filed: Jul. 22, 2020

(65) Prior Publication Data
US 2021/0006812 A1 Jan. 7, 2021

Related U.S. Application Data (63) Continuation of application No. 16/164,480, filed on Oct. 18, 2018, now Pat. No. 10,757,434.

(60) Provisional application No. 62/573,986, filed on Oct. 18, 2017.

(51) Int. Cl.
| | |
|---|---|
| *H04N 19/105* | (2014.01) |
| *H04N 19/172* | (2014.01) |
| *H04N 19/467* | (2014.01) |
| *G06T 1/00* | (2006.01) |
| *G06F 21/00* | (2013.01) |

(52) U.S. Cl.
CPC ......... *H04N 19/467* (2014.11); *G06F 21/00* (2013.01); *G06T 1/0021* (2013.01); *G06T 1/0028* (2013.01); *G06T 1/0085* (2013.01); *H04N 19/105* (2014.11); *H04N 19/172* (2014.11); *G06T 2201/0051* (2013.01); *G06T 2201/0053* (2013.01)

(58) Field of Classification Search
CPC ...... G06F 21/00; G06F 21/10; G06F 21/6245; G06F 2221/0733; G06T 1/0021; G06T 1/0028; G06T 1/0085; G06T 2201/0051; G06T 2201/0053; H04N 19/105; H04N 19/172; H04N 19/467
See application file for complete search history.

(56) References Cited

U.S. PATENT DOCUMENTS

| | | |
|---|---|---|
| 5,825,892 A | 10/1998 | Braudaway |
| 6,983,058 B1 | 1/2006 | Fukuoka |
| 7,738,711 B2 | 6/2010 | Kondo |
| 2002/0090110 A1 | 7/2002 | Braudaway |
| 2005/0111027 A1 | 5/2005 | Cordery |
| 2006/0177114 A1* | 8/2006 | Tongdee ............... G06F 16/58 382/128 |
| 2010/0031014 A1 | 2/2010 | Senda |

(Continued)

*Primary Examiner* — Anner N Holder
(74) *Attorney, Agent, or Firm* — Nixon Peabody LLP (57) ABSTRACT

A computer system for the creation of subliminal image or watermarks where the apparent video is an "obvious" image and a subliminal or "clandestine" image or watermark is hidden within the data structure. The concept is envisioned for the cloaking of images, sound, video or like digitized non-coded information. The cloaked files may be intended for storage, transmission, or clandestine placement in a public file system. The watermark may be used for the subliminal marking of a source of a file, its creation, or for tagging copyrighted information.

10 Claims, 8 Drawing Sheets

(56) References Cited

U.S. PATENT DOCUMENTS

| | | | |
|---|---|---|---|
| 2010/0302438 A1* | 12/2010 | Fujisawa | H04N 7/014 348/E7.003 |
| 2011/0050990 A1* | 3/2011 | Farkash | H04N 21/235 348/E7.001 |
| 2011/0145582 A1* | 6/2011 | Han | H04N 1/32144 713/176 |
| 2016/0286075 A1 | 9/2016 | Beck | |
| 2017/0155917 A1* | 6/2017 | Choi | H04N 19/136 |

* cited by examiner

FIG. 7

CLOAKING AND WATERMARK OF NON-CODED INFORMATION

CROSS-REFERENCE TO RELATED APPLICATIONS

This application is a continuation of U.S. application Ser. No. 16/164,480, filed on Oct. 18, 2018, now allowed, which claims priority to and the benefit of U.S. Provisional Patent Application No. 62/573,986, filed on Oct. 18, 2017, each of which is hereby incorporated by reference herein in its entirety.

FIELD

The present invention is creating a concealed watermark in a digital media.

BACKGROUND OF THE INVENTION

A particular challenge in the fields of medicine and, indeed, healthcare generally is public acceptance of electronic healthcare records by the general public. Of specific concern to patients specifically, is the security, origin and accuracy of an individual's records. The Health Insurance Portability and Accountability Act of 1996, aka "HIPPA" was partly developed to improve the secure portability and continuity of health information in an environment of electronic healthcare records, but it cannot assure security. Like many laws, it specifies particular anticipated abuses and provides penalties for infraction after the fact. In an environment of commonplace identity theft and database intrusion, there evolves a need for making clandestine location of healthcare records difficult, while assuring the accuracy of such data with specific association to individuals and the historical development of such data.

SUMMARY OF THE INVENTION

The present invention is primarily directed to systems and methods for integrating health-relevant data from multiple sources and utilizing the integration to develop records of an individual's wellness, illnesses, or overall state of health. One of many embodiments is the cloaking and/or subliminal watermarking of images. Digital images are comprised of dots, typically referred to as picture elements (PELs) or pixels, where each of the dots can be reduced to a numerical value within organized rows and columns of an image. In some embodiments, data can then be encrypted using changes to these numerical values. In embodiments where additional security is needed for the data, the numerical values can be encrypted, so as to further make examination of the image file difficult. In other embodiments, the data can be encoded into video files addition of additional frames, where the positions of the additional frames indicate a value for each bit of encoded data.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The accompanying drawings exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

The present invention is described with reference to the attached figures, where like reference numerals are used throughout the figures to designate similar or equivalent elements. The figures are not drawn to scale, and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As noted above, a general practice insuring data security in the healthcare industry or elsewhere is the encryption of files. However, malicious intrusion can export such files from a system where powerful systems can "crack" the encryption and extract the root data. However, this process begins with location and identification of such files as distinct from other information in a file storage system. A goal of this invention is to provide a means to cloak data or watermark, which may also be encrypted, so as to disguise its existence within a file. This cloaked data or watermark can be used to provide a history of a file's origin, so as to aid detection and prosecution of the intruder. Additionally, another goal of the invention is incorporate the cloaked data or watermark into the file in such a way that the cloaked data or watermark is preserved, even after conversion of the file from one format to another.

It can be seen that this same means may be useful in the clandestine storage and transmission of classified information, copyrighted files, and other sensitive information without obvious detection.

In a first embodiment, data or a watermark is cloaked using the numeric value of pixels. In particular, the numeric value of a pixel is segregated into two zones. Each zone is a portion or element of an image pixel. One zone carries a portion of the numeric value that primarily contributes to forming the entire obvious image and the other zone includes the data or watermark to be cloaked by the entire obvious image. This cloaked data or watermark can be considered to be contributing to a second subliminal image embedded in the entire obvious image. For example, the numeric values contributing to the entire obvious image and the second subliminal image can be encoded into the most and lesser significant bits of the numeric value of the pixel. Thus, when simply viewed by the human eye, the entire obvious image formed using the numeric values from the first zone are more significant and thus obscure or cloak the subliminal image encoded using the lesser significant bits. Without any encryption, the obvious image would then dominate over the subliminal image as the obvious image when the entire value is taken as a whole. For example, if the obvious image were the more significant byte value of a 32-bit pixel and the lesser 3 significant bytes comprise a finer resolution, but fainter subliminal image value—the subliminal image pixel would be all but invisible (no greater than $1/128$th) of the median obvious image value.

It should be noted that while the various embodiments may be described with respect to image pixels with monochromatic values, this is solely for ease of illustration. However, the various embodiments are not limited in this regard. That is, data can be cloaked in other types of data files in a substantially similar fashion.

However, if the subliminal image is known to exist, the subliminal image can be extracted or removed by discarding the bits associated with the obvious image and shifting the bits associated with the subliminal image to more significant bits. In such cases, some protection may be obtained by encryption. However, in some cases, it may be insufficient.

Figure 1:
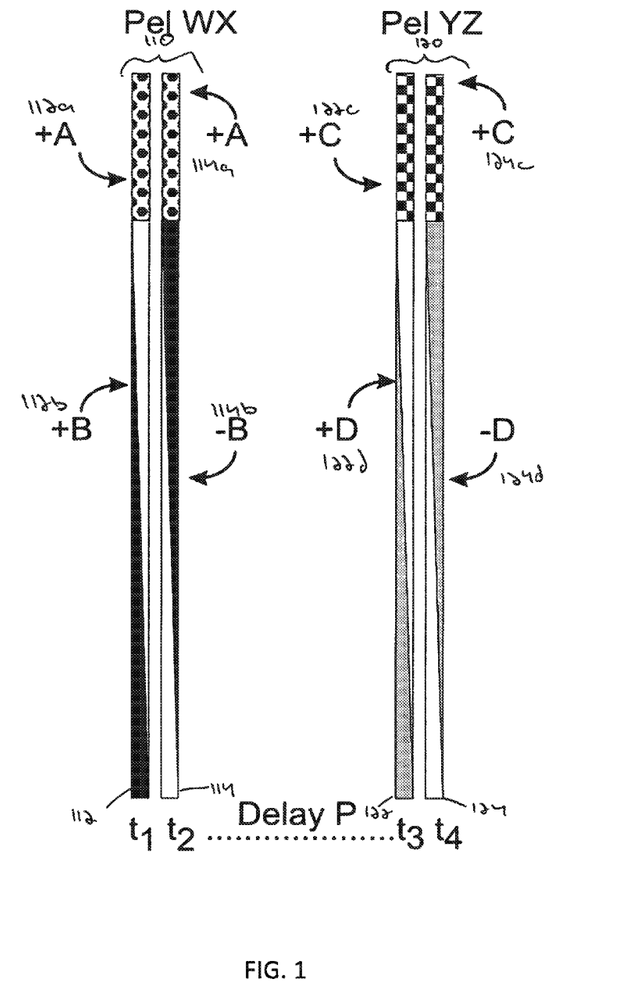
FIG. 1 shows exemplary two pixel pairs, according to an embodiment of the present disclosure.

To address this limitation, additional cloaking of the subliminal image can be provided. This is illustrated in FIG. 1. FIG. 1 shows a first pixel pair 110 with two pixels 112 and 114; and a second pixel pair 120 with two pixels 122 and 124. Each pixel 112, 114, 122, and 124 has a lesser significant portion 112a, 114a, 122c, and 124c and a more significant portion 112b, 114b, 122d, and 124d.

FIG. 1 shows how data or a watermark can be hidden in a pair of pixels by dividing the data or watermark into two values, where the numeric values for the obvious image information are identical. In some configurations, each pixel is repeated, where two values are presented in sequence as part of a double clocked image, where the numeric value of the pixels is divided into two portions (a lesser significant portion 112a, 114a, 122c, and 124c, and a more significant portion 112b, 114b, 122d, and 124d). The first portion 112b, 114b, 122d, and 124d can have a low density value in the more significant bit value end of an N-bit numerical value and a second portion 112a, 114a, 122c, and 124c can have a higher density value in the lesser significant bit value region. This second value is the actual stored information for the data or watermark to be cloaked. For the purposes of explanation, one can assume that the obvious image is in the more significant byte position and the subliminal field occupies the lesser 3 significant bytes.

A second pixel pair 120 then follows in sequence (if the delay is zero) or may be delayed and interleaved with other pixel pairs. Double pixel pairs do not have to be on all pixels or all lines or frames and can only be in a certain section(s). Further either A or B (the lesser significant portions 112a, 114a, 122c, and 124c or the more significant portions 112b, 114b, 122d, and 124d) may be encrypted—or both portions can be encrypted.

Figure 2:
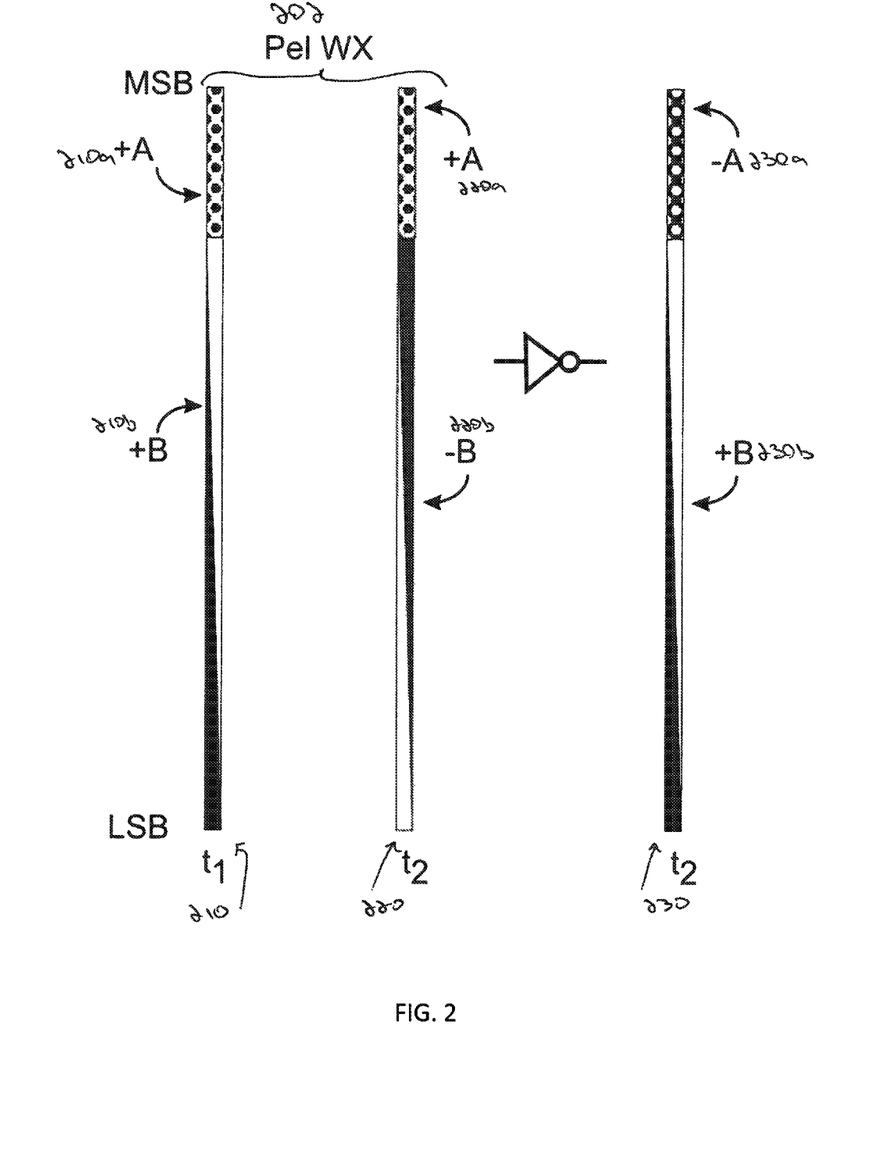
FIG. 2 shows an exemplary inversion of the second pixel in a pair, according to an embodiment of the present disclosure.

FIG. 2 shows that the inversion of one pixel and summation of the two pixels in a pair cancels the obvious image pixel information (A) and doubles the subliminal (B) pixel information. FIG. 2 includes a pixel pair 202 with a first pixel 210 and a second pixel 220. Each pixel 210 and 220 can have a more significant portion 210a and 220a and a lesser significant portion 210b and 220b. FIG. 2 further includes a processed pixel 230 with a more significant portion 230a and a lesser significant portion 230b.

Data can be encoded into the pixel pair 202 using two values that sum up to the data being cloaked. One value is stored as the subliminal pixel value of a first pixel 210 of the pair. The other value is stored by inverting the second pixel 220 of the pair, storing the values as the subliminal pixel value, and reinverting the resulting pixel value. This process yields pixel 230.

To retrieve the encoded data, the numeric value for a second (220) of the pixels is inverted and added to the numeric value for a first (210) of the pixels. The resulting value effectively cancels out the obvious image information since it is identical for the two pixels. The subliminal pixel information can then shifted up and extracted. Additionally, the subliminal pixel information can be decrypted if required.

Figure 3:
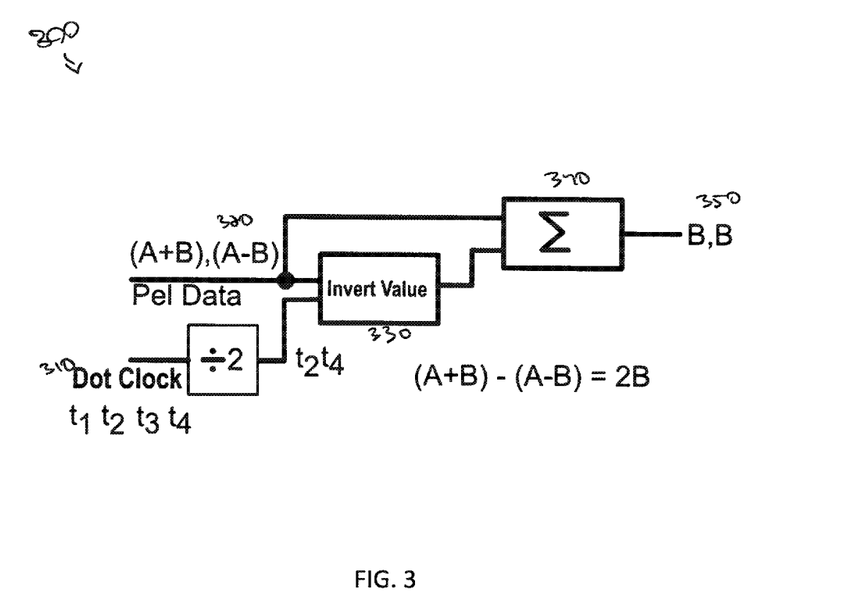
FIG. 3 demonstrates an exemplary logical process, according to an embodiment of the present disclosure.

FIG. 3 shows a schematic of exemplary circuitry 300 to perform the inversion and summation of FIG. 2. Circuitry 300 can include a dot clock 310; pel data 320; an invert value location 330; a summation location 340; and an output 350. The dot clock 310 can provide for taking alternate pixels as input to the inversion procedure occurring at 330. The inversion procedure at 330 can perform an inversion method as described with respect to FIG. 2A. The summation procedure at 340 can perform a summation method as described with respect to FIG. 2A. Therefore, the circuitry 350 can yield an output 350 which yields the (B) values (two B pixels in sequence retaining the double clock rate). For audio information, the "pels" would be encoded segments of a digitized stream.

Figure 4:
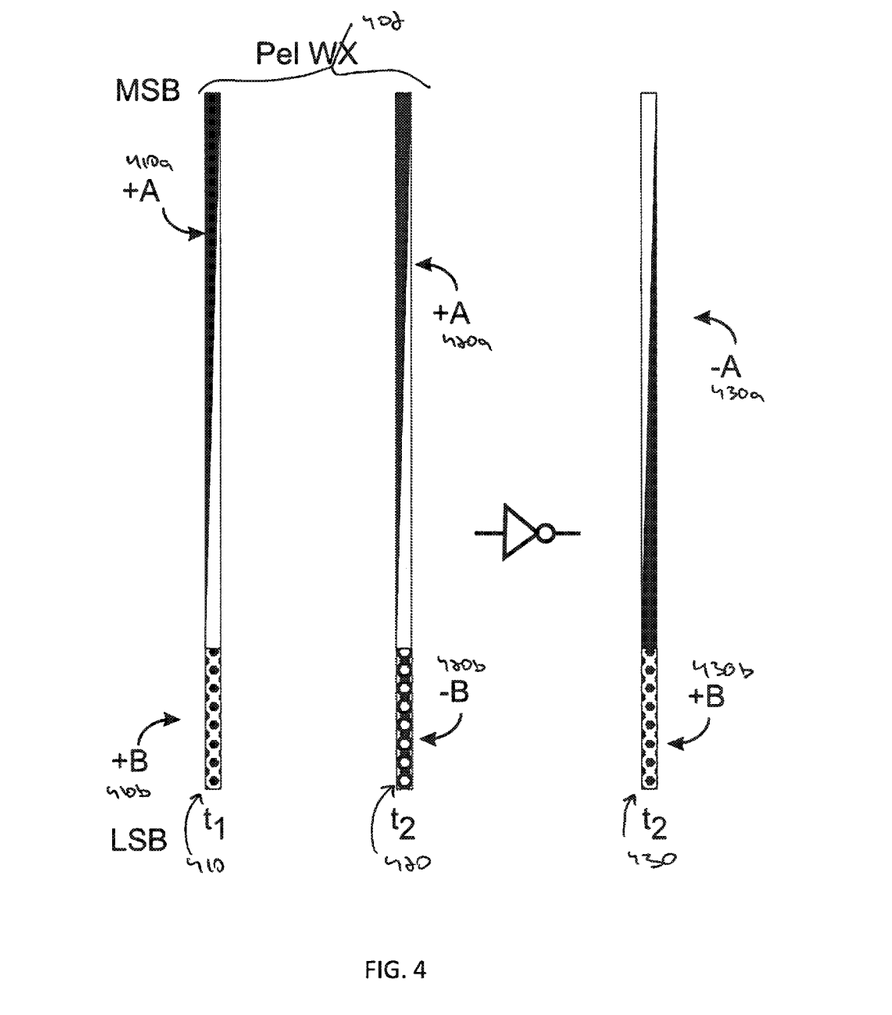
FIG. 4 illustrates an exemplary process of placing a subliminal watermark within an obvious image pixel, according to an embodiment of the present disclosure.

FIG. 4, shows a variation on the technique of FIG. 2. FIG. 4 includes a pixel pair 402 with a first pixel 410 and a second pixel 420. Each pixel 410 and 420 can have a more significant portion 410a and 420s and a lesser significant portion 410b and 420b. FIG. 4 further includes a processed pixel 430 with a more significant portion 430a and a lesser significant portion 430b. In the technique demonstrated in FIG. 4, the subliminal information (410b and 420b) is a lesser significant byte of watermark information, where the obvious image (410a and 420a) is 3-byte value more significant byte, which may or may not be encrypted.

One value can be stored as the subliminal pixel value 410b of a first pixel 410 of the pair to yield 430b. The other value 430a is stored by inverting the second pixel 420 of the pair, storing the values as the obvious pixel value 430a, and reinverting the resulting pixel value. This process yields pixel 230.

It is considered analogous that pixels may also be duplicated dot by dot, line by line, frame by frame for video. Such types of pixel pairs can be encoded and decoded in a substantially similar fashion.

It should be noted that although the examples above refer to encoding data into least or more significant bits of numeric values for image pixels, the various embodiments are not limited in this regard. For example, data can be encoded by means of varying the properties of all or a portion of the obvious image. For example, contrast or brightness levels for one pixel relative to the other can be adjusted in accordance with the data being encoded. In such a configuration, the encoding can be such that the difference cannot be observed by the human eye, but still provide a difference sufficient to be detected electronically. In such a configuration, even if the format of the pixels is changed, this underlying difference will still be present.

Figure 5:
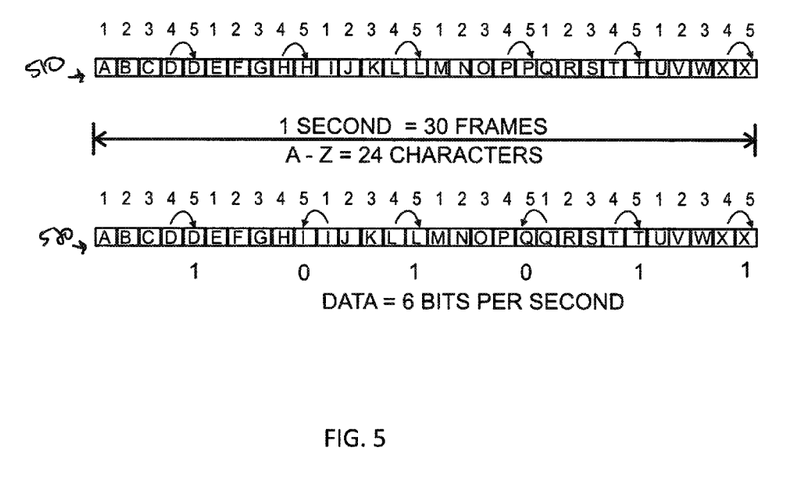
FIG. 5 illustrates an exemplary video watermark, according to an embodiment of the present disclosure.

As noted above, the cloaking of the various embodiments can be used with various types of files, such as video files. One exemplary scheme 500 for using video files is shown in FIG. 5. In this scheme 500, one way to insert a subliminal watermark in video would be a variation on a technique for converting 24 frame per second motion pictures into 30 frame per second NTSC standard television—where every 5th television frame is a duplicate of the previous 4th motion picture frame. Motion picture 510 of FIG. 5 demonstrates this technique. This dance can be done 6 times per second, yielding 30 frames from 24. The human eye is oblivious to the insertion of these duplicated additional frames. Regular insertion of duplicate frames can maintain the pace of the information and prevent detection of the surreptitious watermark by the human eye. Frame insertions comprising random data can be noticed by the human eye, but duplicate frames are not detected.

Normally, at 30 frames per second, the differences between adjacent frames are imperceptible by the human eye. This can therefore be leveraged to provide a means to encode data into the video. For example, the additional 5th frame can simply be a duplicate of a preceding or a next frame. The arrangement can then be used to indicate a "1" or a "0". That is, if the duplicate is the preceding frame, this can be considered a digital "1". If the additional frame were a duplicate of the next frame this could be considered a digital "0". This would allow 6 bits of information for every 24 frames or 6 bits per second. FIG. 5 demonstrates this analysis as applied to motion picture 520.

Although FIG. 5 demonstrates regular duplication of frames, the present disclosure can provide for randomizing the duplications anywhere in the motion picture. In some examples, the locations of the duplications can provide a unique signature or contain keys which hold significance to the vendor. Additionally, in some examples, the duplicated frames can be irregular or infrequent, so long as the total number of frames still provides for a 30 FPS motion picture.

In some examples, the code embedded via the digital 1's and 0's into the motion picture can individually watermark copyrighted pictures.

In some examples, slightly different watermarks can be sent to different theatres to identify where a copyright originates from. In some cases, the watermark can have a date, time, and location embedded. This can help identify where a stolen version of the copyrighted work came from. For example, a camcorder recording a motion picture in a theatre captures the watermark because the recording will contain the duplicated frames.

Conversion from 30 FPS video to 24FPS motion picture is done by removing every 6th frame. However, this can be timed, such that the watermark encoding by duplicate frames is retained.

In an analogous fashion, 24 frame per second movies are converted to 25 frame per second European television by inserting a 25th frame. Again, this 25th frame could be a duplicate of the 24th frame, or a duplicate of the 26th frame. This would yield a significantly slower date rate of 1 bit per second. This frame by frame watermark could be in addition and combined with the previous subliminal watermark techniques as initially described. In both scenarios, the watermark would be detected by comparing adjacent frames for "identicality" and determining if the 5th frame equaled the 4th or the 6th to detect 1 or 0.

In some examples of the present disclosure, fractions of sections of audio recordings can be duplicated as well. Such altered audio content can be undetectable to the human ear but recognizable by a computer. Altered audio content can be changed similar to the discussion above with respect to video content, as a person skilled in the art would readily understand.

Figure 6:
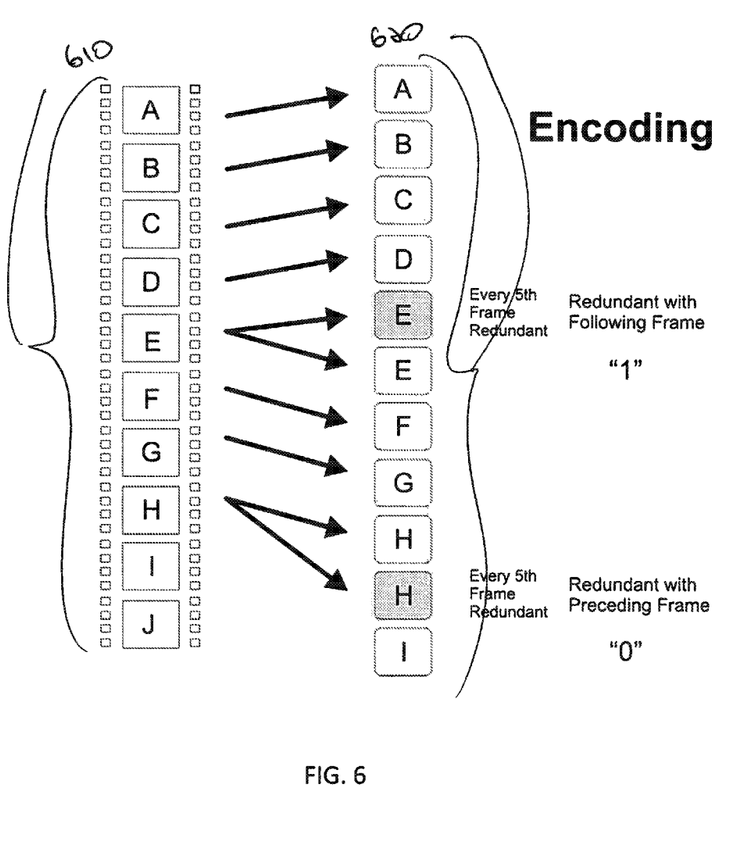
FIG. 6 illustrates another exemplary video watermark, according to an embodiment of the present disclosure.

FIG. 6 also shows a conversion from 24 fps in motion picture 610 to 30 fps in motion picture 620, which is undetectable to the eye. In particular, FIG. 6 shows the modulation of information onto a video stream (undetectable to the eye) where every 5th frame is redundant with either preceding frame or following frame (shown in motion picture 620). It is valid if there is information present (either 1 or 0)—unless all frames are redundant (Static Image).

Figure 7:
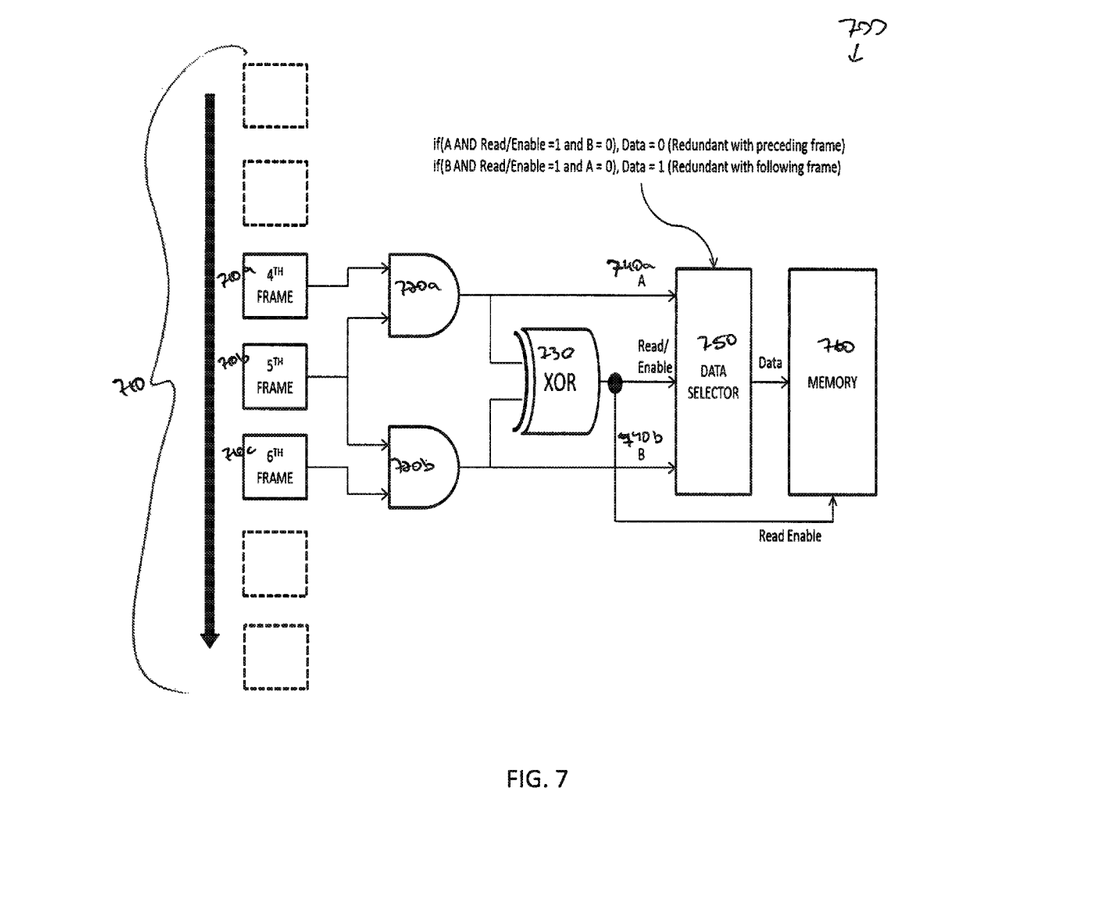
FIG. 7 demonstrates an exemplary process for extracting the subliminal value from a video, according to an embodiment of the present disclosure.

FIG. 7 shows an exemplary detection system 700 for use with the converted stream of FIG. 6. System 700 can include a plurality of frames 710*a*, 710*b*, and 710*c*; comparison components 720*a* and 720*b*; an XOR component 730; an output logical value location 740*a* and 740*b*; a data selector 750; and a memory 760.

System 700 can identify correlations between consecutive frames through any algorithm that detects similarity at some degree of correlation. The advantage of this means is that it would survive format conversions (e.g. analog to digital, uncompressed to compressed, MP2 to MP4).

The detection system 700 operates as follows. At any one time, three consecutive frames (e.g., $4^{th}$ frame 710*a*, $5^{th}$ frame 710*b*, and 6th frame 710*c*) are analyzed. The first two frames ($4^{th}$ frame 710*a* and $5^{th}$ frame 710*b*) are compared at comparison component 720 to see if there is a correlation between the frames. A logical "1" or a "0" value can be generated at 740*a* A to indicate whether or not a correlation exists. At the same time, the last two frames (5th frame 710*b* and $6^{th}$ frame 710*c*) are compared at comparison component 720*b* to see if there is a correlation between these frames 710*b* and 710*c*. Again, a logical "1" or a "0" value can be generated at 740*b* B to indicate whether or not a correlation exists. Thereafter, these values generated by the two correlations are fed into an XOR component 730 to determine if a redundant frame is present relative to the middle frame 710*b*, i.e., to determine whether data is present.

The XOR component 730 is configured to generate a signal (Read/Enable) that indicates that data is present for reading. This happens if only the preceding frame (4th frame 710*a*) or only the following frame (6th frame 710*c*) are redundant relative to the middle frame 710*b*, that is A=1 and B=0 or A=0 and B=1. If all three frames 710*a*, 710*b*, and 710*b* correlate (A=B=1) or all three frames are different (A=B=0), then it is assumed no data is stored and the Read/Enable signal is not asserted.

Thereafter, a selector component can be used with a memory 760 to store the data value. As shown in FIG. 7, the selector 750 then uses the output of the two correlations (A, B) together with the Read/Enable signal to determine whether the data value to be stored should a "1" or a "0". The data value is then asserted on the output of the selector 750 (Data). Finally, at the memory, the output of the selector 750 (Data) can be stored when the Read/Enable signal is asserted.

It should be noted that the method for encoding data into video described above can be used with other methods to increase the data rate. For example, the redundant frame can have at least one other electronically detectable alteration, such a brightness or contrast. In this manner, the redundant frame and the original frame will still have a high degree of correlation to indicate that data is present and to extract the first bit of data. The differences between the redundant frame and the original frame can then be analyzed to obtain the encoded date.

The invention is directed to systems and methods for synthesizing and integrating health-relevant data, but may have applications in additional fields such as the storage or transmission of clandestine data or the subliminal watermarking of copyrighted video. The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

Therefore, the present disclosure provides for various methods of data recording, analysis and processing, and more particularly, to analyzing and processing data derived from disparate sources of healthcare information data. There is particular focus on digitized non-coded information such as images, video, audio and digitized analog recordings of data such as EKG, EEG, Capnography, and other sources that do not originate in numerical (coded) format. The information is created, so as to generate data-based indicia within specific healthcare records and is applicable to all records generally based on non-coded information.

The present disclosure can provide for methods to a validate non-coded information. Inserting a watermark, according to the present disclosure, can be maintained through encoding of the information.

Figure 8A:
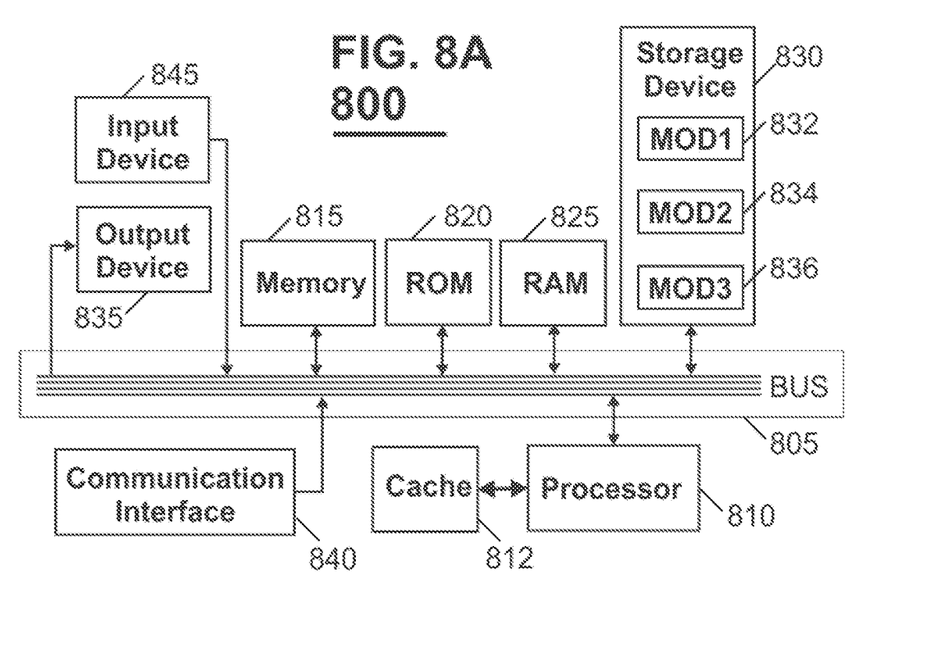
FIGS. 8A and 8B show an exemplary configuration of a computing system for implementing the various embodiments, according to an embodiment of the present disclosure.
Figure 8B:
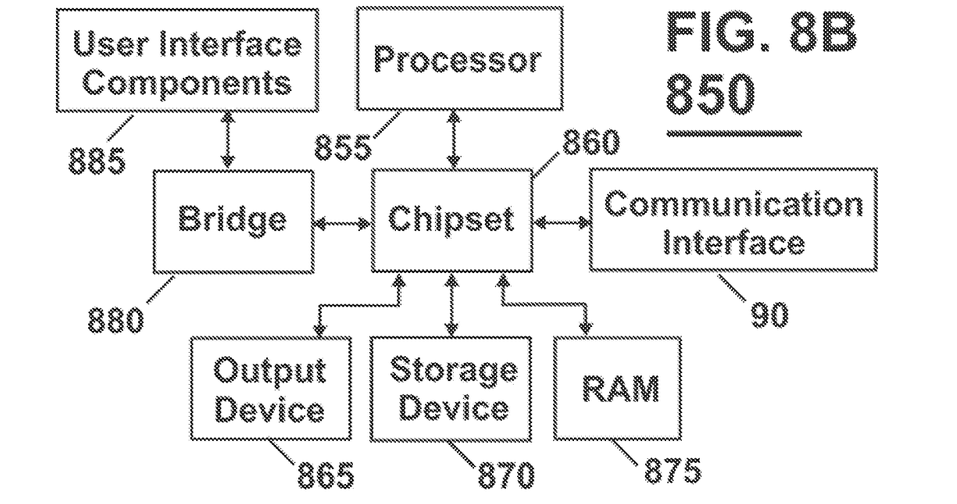

FIG. 8A, and FIG. 8B illustrate exemplary possible system configurations. The more appropriate configuration will be apparent to those of ordinary skill in the art when practicing the present technology. Persons of ordinary skill in the art will also readily appreciate that other system configurations are possible.

FIG. 8A illustrates a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B illustrates a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that exemplary systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some configurations the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

The invention, as also already noted, can be embedded in a computer program product, such as a computer-readable storage medium or device which when loaded in a computer system is able to carry out the different methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A method for encoding data in a video stream, the method comprising:
    receiving an initial video stream having a first frame, a second frame that follows consecutively the first frame, and a third frame that follows consecutively the second frame;
    determining a value associated with the data to encode in the initial video stream;
    in response to determining the value is a first value, inserting an additional frame between the first frame and the second frame of the initial video stream, the additional frame being identical to the second frame of the initial video stream, thereby converting the initial video stream to an encoded video stream, wherein the additional frame being identical to the second frame and preceding the second frame is indicative of the first value; and
    in response to determining the value is a second value, inserting the additional frame between the second frame and the third frame of the initial video stream, thereby converting the initial video stream to an encoded video stream, wherein the additional frame being identical to the second frame and following the second frame is indicative of the second value.

2. The method of claim 1, wherein the encoded data is associated with a unique identification of the video stream.

3. The method of claim 1, wherein the initial video stream is about 24 frames per second, and the encoded video stream is about 30 frames per second, wherein the encoded video stream includes six of the additional frames per second.

4. The method of claim 1, wherein the additional frame has been modified to include at least one electronically detectable alteration.

5. The method of claim 1, wherein the additional frame is inserted at a frame location of the encoded video stream that is associated with a unique signature that holds significance to a vendor of the initial video stream.

6. The method of claim 1, wherein the initial video stream is an EKG, an EEG, or a capnography.

7. The method of claim 1, wherein the encoded data is healthcare information data.

8. The method of claim 1, wherein the encoded data includes one or more first values and one or more second values together associated with a concealed watermark for the initial video stream.

9. The method of claim 4, wherein the at least one electronically detectable alteration affects brightness and/or contrast of the additional frame.

10. The method of claim 1, wherein either a presence or an absence of the additional frame in the encoded video stream is associated with a portion of the encoded data.

\* \* \* \* \*